US012602570B2

(12) United States Patent (10) Patent No.: US 12,602,570 B2
Kaul et al. (45) Date of Patent: Apr. 14, 2026

(54) MACHINE LEARNING DRIVEN DISPERSION CURVE PICKING

(71) Applicant: SCHLUMBERGER TECHNOLOGY CORPORATION, Sugar Land, TX (US)

(72) Inventors: Anisha Kaul, Houston, TX (US); Phillip Bilsby, Brighton (GB); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 899 days.

(21) Appl. No.: 17/758,636

(22) PCT Filed: Jan. 13, 2021

(86) PCT No.: PCT/US2021/013161
§ 371 (c)(1),
(2) Date: Jul. 12, 2022

(87) PCT Pub. No.: WO2021/146230
PCT Pub. Date: Jul. 22, 2021

(65) Prior Publication Data
US 2023/0084403 A1      Mar. 16, 2023

Related U.S. Application Data

(60) Provisional application No. 62/960,890, filed on Jan. 14, 2020.

(51) Int. Cl.
*G06N 3/045* (2023.01)
*G01V 1/28* (2006.01)
(Continued)

(52) U.S. Cl.
CPC ............. *G06N 3/045* (2023.01); *G01V 1/282* (2013.01); *G01V 1/325* (2013.01); *G01V 1/50* (2013.01);
(Continued)

(58) Field of Classification Search
CPC .......... G06N 3/045; G06N 3/08; G06N 3/088; G06N 3/02; G06N 20/00; G01V 1/282;
(Continued)

(56) References Cited

U.S. PATENT DOCUMENTS

2011/0120724 A1*  5/2011  Krohn ...................... G01V 1/30
                                                                      703/2
2012/0218861 A1*  8/2012  Xia ......................... G01V 1/282
                                                                      367/73
2019/0302290 A1   10/2019  Alwon

OTHER PUBLICATIONS

Li et al., "Separation of Multi-Mode Surface Waves by Supervised Machine Learning Methods", Geophysical Prospecting, First Published Dec. 19, 2019, pp. 1270-1280. (Year: 2019).*
(Continued)

*Primary Examiner* — Saif A Alhija
(74) *Attorney, Agent, or Firm* — Jeffrey D. Frantz

(57) ABSTRACT

A method for modeling a subterranean volume includes receiving seismic data comprising a signal, generating a semblance in the frequency-wavenumber domain for the seismic data, wherein the semblance represents a coherence of the signal in the frequency-wavenumber domain, extracting one or more wave energy modes in the semblance using a machine learning model trained to identify dispersion curves in the semblance based on a visible characteristic of the dispersion curves, and generating a model representing surface wave propagation based at least in part on the identified one or more wave energy modes.

19 Claims, 12 Drawing Sheets

(51) Int. Cl.
    *G01V 1/32*           (2006.01)
    *G01V 1/50*           (2006.01)
    *G06N 3/08*          (2023.01)

(52) U.S. Cl.
    CPC ........... *G06N 3/08* (2013.01); *G01V 2210/44* (2013.01); *G01V 2210/66* (2013.01)

(58) Field of Classification Search
    CPC ...... G01V 1/325; G01V 1/50; G01V 2210/44; G01V 2210/66; G06F 17/18
    See application file for complete search history.

(56)            References Cited

OTHER PUBLICATIONS

Bensen, G. D., et al. "Processing seismic ambient noise data to obtain reliable broad-band surface wave dispersion measurements." Geophysical journal international 169.3 (2007): 1239-1260 (Year: 2007).*

Tang, Xiao-Ming, Chen Li, and Douglas J. Patterson. "A curve-fitting technique for determining dispersion characteristics of guided elastic waves." Geophysics 75.3 (2010): E153-E160. (Year: 2010).*

Köhler, Andreas, Matthias Ohrnberger, and Frank Scherbaum. "Unsupervised pattern recognition in continuous seismic wavefield records using self-organizing maps." Geophysical Journal International 182.3 (2010): 1619-1630 (Year: 2010).*

Gehne, Maria, and Richard Kleeman. "Spectral analysis of tropical atmospheric dynamical variables using a linear shallow-water modal decomposition." Journal of the atmospheric sciences 69.7 (2012): 2300-2316 (Year: 2012).*

Li et al., "Separation of Multi-Mode Surface Waves by Supervised Machine Learning Methods", Geophysical Prospecting, First Published Dec. 19, 2019, pp. 1270-1280; available at: https://doi.org/10.1111/1365-2478.12927.

Ronneberger et al., "U-Net: Convolution Network for Biomedical Image Segmentation", in Medical Image Computing and Computer-Assisted Intervention (MICCAI), Nov. 18, 2015, pp. 234-241.

Laibacher et al., "M2U-Net: Effective and Efficient Retinal Vessel Segmentation for Resource-Constrained Environments", arXiv preprint, Nov. 10, 2019, 10 pages, available at: https://arxiv.org/abs/1811.07738v1.

Search Report and Written Opinion of International Patent Application No. PCT/US2021/013161 on Apr. 12, 2021; 9 pages.

Kaul et al., "Machine learning driven dispersion curve picking for surface wave analysis modeling and inversion", 82nd EAGE Conference + Exhibition, 2020, 5 pages.

Strobbia et al., "Surface Waves—Use Them Then Lose Them", 71st EAGE Conference and Exhibition, Jun. 2009, 5 page.

Milletari et al., "V-Net: Fully Convolutional Neural Networks for Volumetric Medical Image Segmentation". In: 2016 Fourth International Conference on 3D Vision (3DV). pp. 565-571. IEEE (Oct. 2016).

He et al., "Identity Mappings in Deep Residual Networks", In: Leibe B., Matas J., Sebe N., Welling M. (eds) Computer Vision—ECCV 2016. ECCV 2016. Lecture Notes in Computer Science, vol. 9908. 15 pages.

Ester, M., H. P. Kriegel, J. Sander, and X. Xu "A Density-Based Algorithm for Discovering Clusters in Large Spatial Databases with Noise", In Proceedings of the 2nd International Conference on Knowledge Discovery and Data Mining, Portland, OR, AAAI Press, pp. 226-231. 1996.

Extended Search Report issued in European Patent Application No. 21741365.7 dated Dec. 21, 2023, 8 pages.

Xia, K., "Analyses and Applications of Seismic surface waves Using Machine Learning Algorithm", Dissertation, Dec. 2018, retrieved fromt the internet: [ URL:https://www.proquest.com/docview/2471483427?pq-origsite=gscholar&fromopenview=true&sourcetype=Dissertations%20&%20Theses ], 115 pages.

International Preliminary Report on Patentability of International Patent Application No. PCT/US2021/013161 dated Jul. 28, 2022, 7 pages.

* cited by examiner

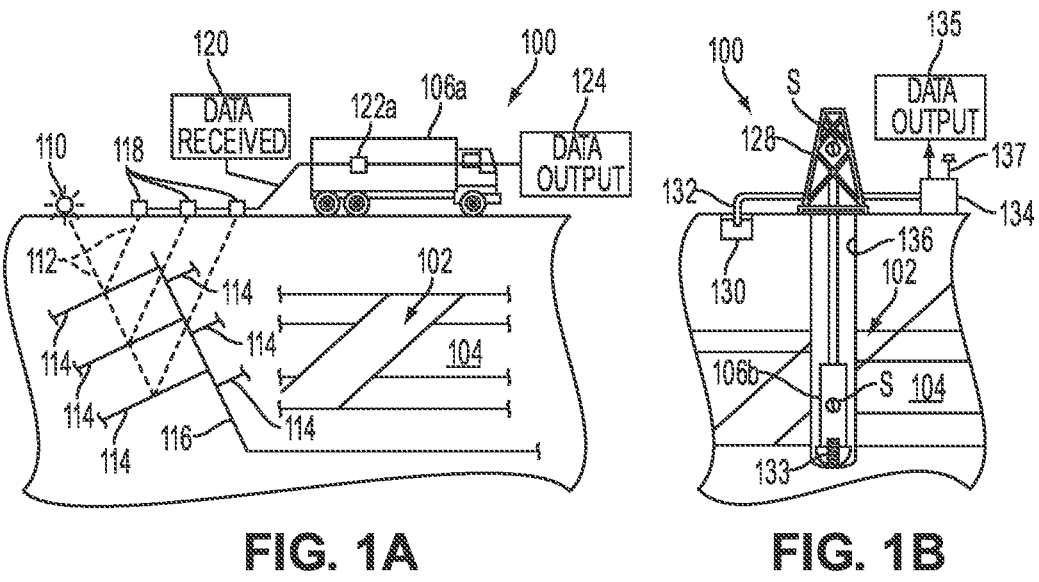
FIG. 1A     FIG. 1B
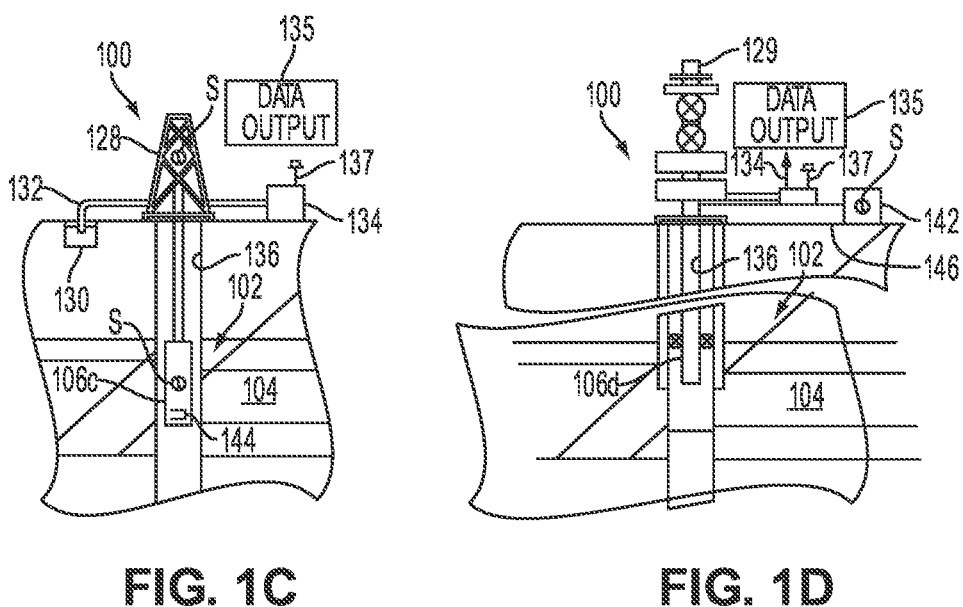
FIG. 1C     FIG. 1D

MACHINE LEARNING DRIVEN DISPERSION CURVE PICKING

CROSS-REFERENCE TO RELATED APPLICATIONS

This application is a National Stage Entry of International Patent Application No. PCT/US2021/013161, filed Jan. 13, 2021, which claims priority to U.S. Provisional Patent Application having Ser. No. 62/960,890, which was filed on Jan. 14, 2020 and is incorporated by reference herein in its entirety.

BACKGROUND

Processing onshore seismic data includes compensating for the near-surface waves from both imaging and noise attenuation perspectives. The characteristics of the near-surface waves, with respect to lateral and vertical velocity changes, can distort the travel times of the recorded seismic signal and mask the signal in coherent surface wave energy that may be complicated due to scattering and aliasing.

One technique to resolve these issues is to perform surface wave analysis. During the analysis, dispersive velocity characteristics of the surface waves are extracted, and may then be exploited for noise modeling and inversion to build near-surface velocity models for imaging. The first step in this methodology is the analysis of the dispersive properties, e.g., frequency-phase velocity relationship, of the surface wave energy as it travels through the near-surface. Such analysis facilitates gaining an understanding of how the phase velocity of the surface waves changes with frequency over the full survey area.

As part of the analysis, frequency-wavenumber (F-K) semblances are created at each analysis location. These semblances are then interpreted to extract the frequency-phase velocity curves, referred to as dispersion curves, of the different surface wave modes across the survey. On completion of the analysis, the resulting dispersion curves can then be used for both modeling and removal of the complex surface wave noise as well as building a near-surface velocity model, through surface wave inversion, which is used for seismic imaging.

Surface wave analysis, however, involves intensive human parameterization of the picking and tracking of the dispersion curves within the semblance volumes.

SUMMARY

Embodiments of the disclosure include a method for modeling a subterranean volume that includes receiving seismic data comprising a signal, generating a semblance in the frequency-wavenumber domain for the seismic data, wherein the semblance represents a coherence of the signal in a frequency-wavenumber domain, extracting one or more wave energy modes in the semblance using a machine learning model trained to identify dispersion curves in the semblance based on a visible characteristic of the dispersion curves, and generating a model representing surface wave propagation based at least in part on the identified one or more wave energy modes.

Embodiments of the disclosure also include a non-transitory computer-readable medium storing instructions that, when executed by at least one processor of a computing system, cause the computing system to perform operations. The operations include receiving seismic data comprising a signal, generating a semblance in a frequency-wavenumber domain for the seismic data, wherein the semblance represents a coherence of the signal in the frequency-wavenumber domain, extracting one or more wave energy modes in the semblance using a machine learning model trained to identify dispersion curves in the semblance based on a visible characteristic of the dispersion curves, and generating a model representing surface wave propagation based at least in part on the identified one or more wave energy modes.

Embodiments of the disclosure further include a computing system that includes one or more processors, and a memory system comprising one or more non-transitory computer-readable media storing instructions that, when executed by at least one of the one or more processors, cause the computing system to perform operations. The operations include receiving seismic data comprising a signal, generating a semblance in a frequency-wavenumber domain for the seismic data, wherein the semblance represents a coherence of the signal in the frequency-wavenumber domain, extracting one or more wave energy modes in the semblance using a machine learning model trained to identify dispersion curves in the semblance based on a visible characteristic of the dispersion curves, and generating a model representing surface wave propagation based at least in part on the identified one or more wave energy modes.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 4A illustrates the input source or receiver gather. FIG. 4B illustrates the associated high-resolution frequency-wavenumber (F-K) domain semblance, and FIG. 4C illustrates the dispersion curve picking and tracking of the dominant modes in the semblance, according to an embodiment.

DESCRIPTION OF EMBODIMENTS

Figure 2:
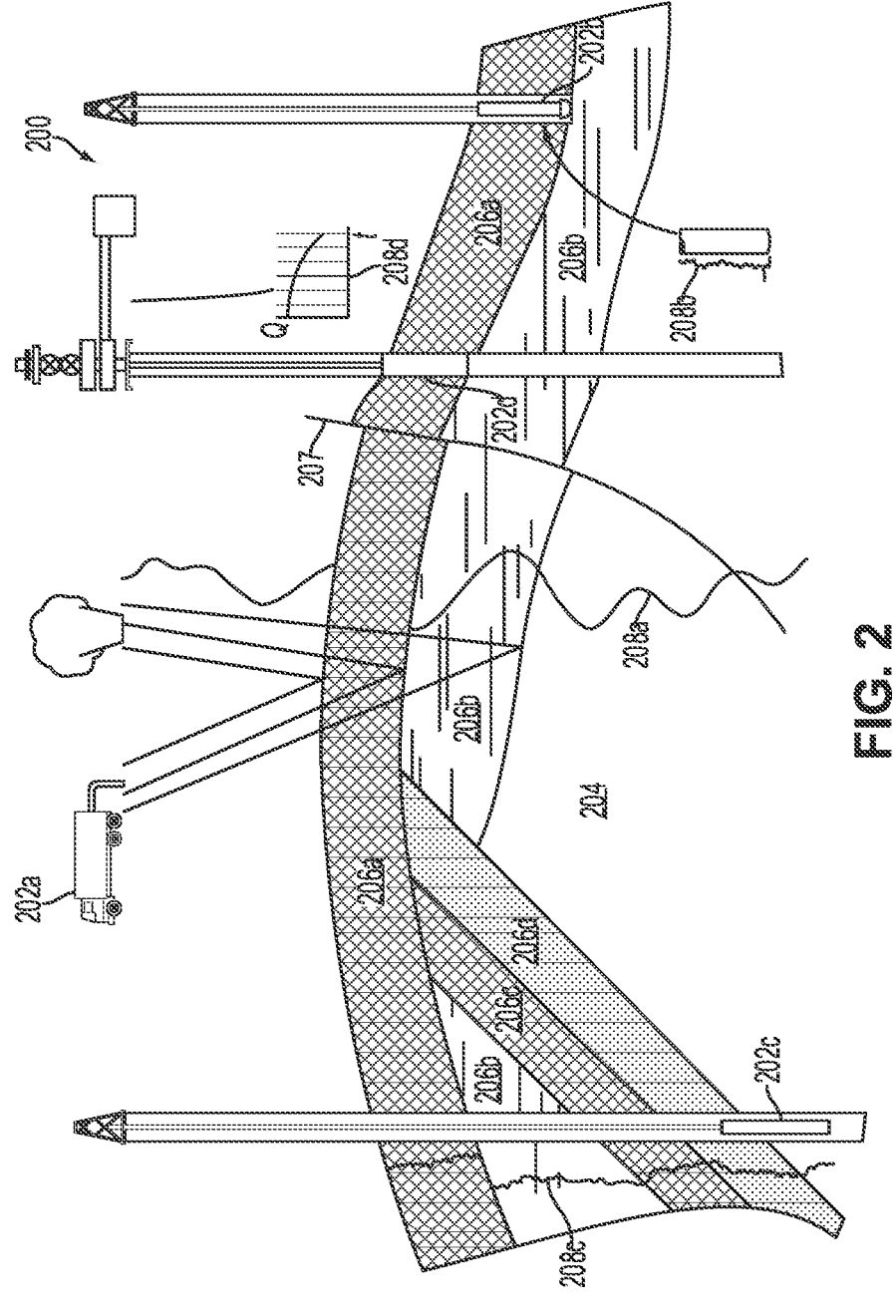

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106csuspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106ddeployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208cmay also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
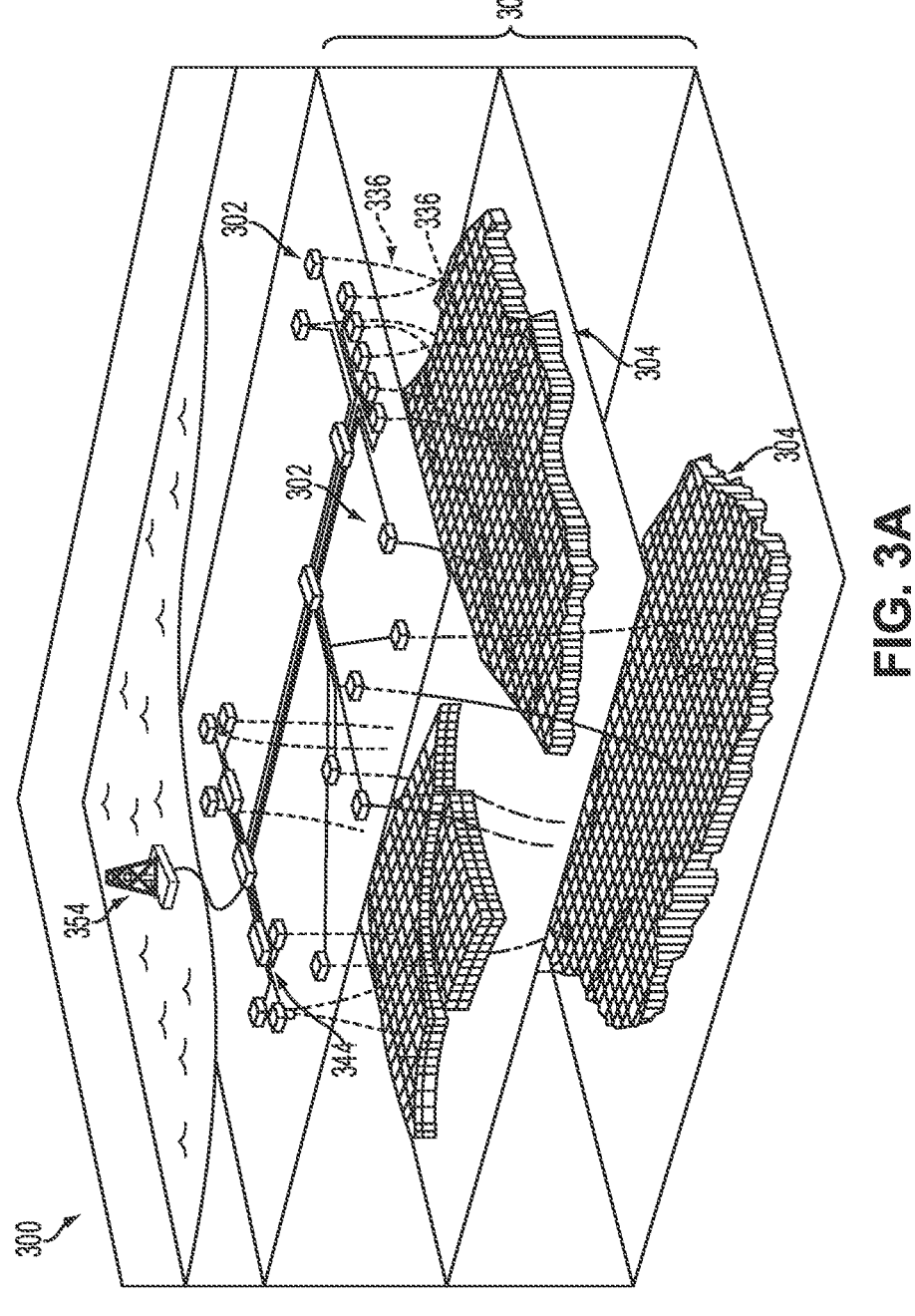

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
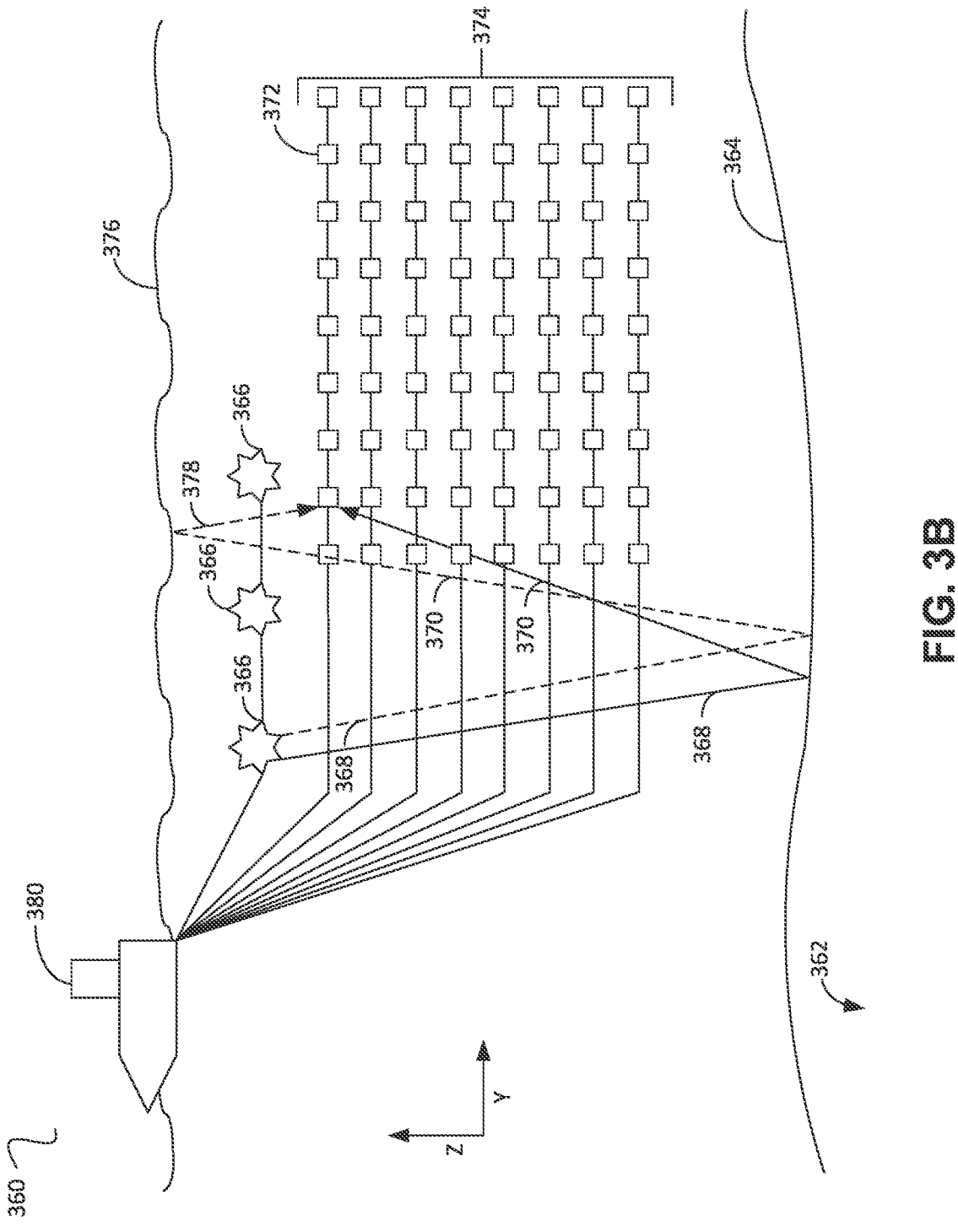

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Surface Wave Analysis

The quality of onshore seismic data may be affected by characteristics of the near-surface. To compensate for the distortion of travel times of seismic energy, workflows have been formulated to analyze, model, and invert surface waves. Such approaches generally include human labor-intensive picking of high energy modes on conditioned semblances that represent each analysis location on the dispersion survey. Embodiments of the present disclosure implement a globally trained machine learning model to extract one or more surface wave modes (e.g., the fundamental mode, i.e., the mode with the highest surface wave energy), minimizing or potentially avoiding human intervention.

Figures 4A, 4B, 4C:
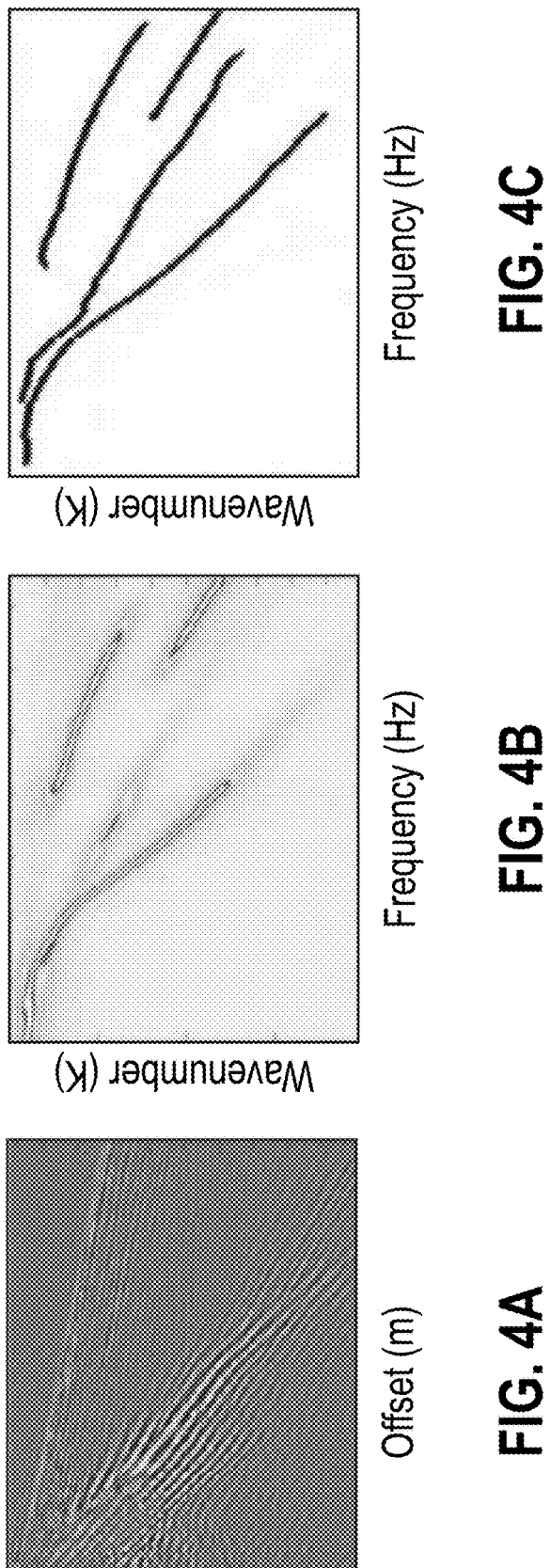
FIGS. 4A-4C illustrates different stages of dispersion curve identification in seismic data. In particular.

Surface wave analysis is generally conducted in a two-stage approach. The first stage is to create high-resolution semblances in a frequency-wavenumber (F-K) domain at both source and receiver locations, which provide a representation of the various surface wave modes in F-K domain. For example, FIG. 4A illustrates seismic data in an offset-time domain, which is converted to a semblance in the F-K domain, as shown in FIG. 4B. The second stage involves picking F-K pairs for the dominant modes (e.g., the fundamental mode) from the F-K semblance. A peak picker may be used, constrained by a combination of velocity and frequency zones that are determined interactively, to pick the F-K pairs (FIG. 4C). Once the main modes are picked, the resulting F-K pairs are consolidated into a single mode track, which may then be ordered, so that the picks within a single track are consistently numbered at associated analysis locations, e.g., with the fundamental mode numbered as 1. This ordering is used for the subsequent noise modeling step, as these track-order numbers directly map to the order of the surface wave noise removal.

A challenge is presented by the presence of aliased surface wave modes, the close proximity of modes to one another and the individual modes exhibiting incoherency, i.e. not one single continuous energy train in the F-K semblance. These issues may occur in combination, and are further exacerbated if there is lateral variation over a short distance, and may call for high levels of human intervention and parameter tuning to achieve satisfactory picking.

Picking Dispersion Curves Using Machine Learning

Figure 5:
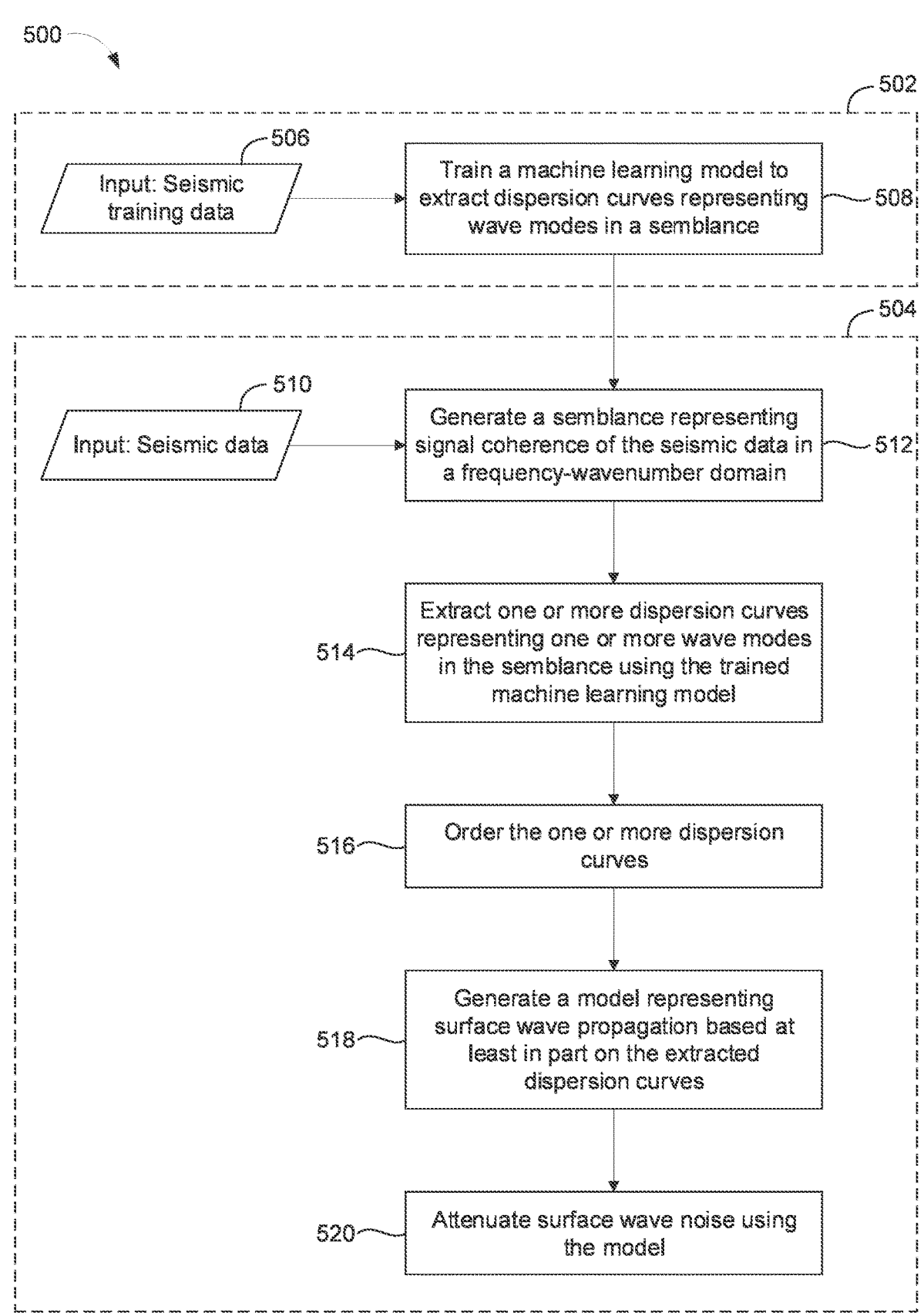
FIG. 5 illustrates a flowchart of a method for dispersion curve extraction in surface wave analysis, according to an embodiment.

FIG. 5 illustrates a flowchart of a method 500 for seismic processing, according to an embodiment. In particular, for example, the method 500 may be used for surface wave analysis, which may be used to generate a surface wave noise model and/or velocity model, e.g., stemming from surface waves propagating at or near the surface. These models may, in turn, be used to attenuate noise model and/or subsurface seismic imaging. The method 500 may leverage machine learning to automate the extraction of wave modes from the F-K semblance, thereby avoiding at least some of the labor-intensive parameterization tasks discussed above.

Since the method 500 may implement a machine learning model, there may generally be two stages: a training stage 502 and an implementation stage 504, each of which includes potentially several worksteps. In practice, there may not be a bright line distinction between these two stages 502, 504, at least because the machine learning model may be trained during the implementation stage 504, e.g., based on user feedback (supervised learning) or self-learning/behavior pattern identification (e.g., clustering or another form of unsupervised learning). Further, the training stage 502 is described herein by way of example as using a supervised learning technique, capitalizing on a (relatively) small data set of labeled input; however, it will be appreciated that this supervised learning may be supplemented or replaced, in some embodiments, with unsupervised learning, e.g., clustering.

In general, the training stage 502 may include receiving seismic training data, as at 506. The seismic training data may include signals recorded by geophones or other seismic receiving devices in a field, or synthetic (computer-generated) seismic data representing a simulated survey. In an embodiment, the seismic training data may include a plurality of seismic signals, e.g., in a time/space domain. For example, offset and time may be plotted for the seismic signals. The seismic data may then be converted (transformed) to a frequency-wavenumber (F-K) domain, and a semblance may be generated which generally represents coherency of the signals at the different locations in the F-K domain. These semblances may be relatively high-resolution and may be created at both source and receiver locations in the survey. As will be described, according to an example, in greater detail below, the training stage 502 may then train the machine learning model to extract dispersion curves, each representing a wave mode in the semblance. For example, the machine learning model may be implemented to recognize visible features and create a non-linear function that predicts the presence of dispersion curves (e.g., as a set of pixels in the semblance), labels the dispersion curves, and outputs the labels, e.g., in a text file that identifies locations (frequency/wave number pairings) in the semblance that represent the dispersion curves.

Once the machine learning model is (at least partially) trained, i.e., the training stage 502 is complete, the method 500 may proceed to the implementation stage 504. The implementation stage 504 may again include receiving seismic input data, e.g., seismic signals collected as part of a survey and, e.g., in a time/space domain, such as an offset-time domain. A semblance in the frequency-wavenumber domain, representing signal coherence in the seismic data, may then be generated as at 512. From this semblance, one or more dispersion curves representing one or more wave modes in the semblance may be extracted (e.g., identified, labeled, etc.) by the machine learning model, as at 514. Since the conditioned semblances are normalized to have amplitude values in [0, 1], preprocessing may be omitted. Image rotation may also not be applied so as to retain the information about the positioning of the modes relative to the entire semblance panel and the higher modes of energy.

In some embodiments, the dispersion curve for the fundamental mode may be identified, but in other embodiments, multiple dispersion curves for multiple wave modes may be extracted. Accordingly, in the latter embodiments, the dispersion curves may be ordered, as at 516, e.g., in terms of frequency, energy, or any other parameter that may prove useful in subsequent processing application. The method 500 may then integrate the extraction of the dispersion curves in the semblance into further processing, which may assist seismologists and other users to generate models of the subsurface domain, and, e.g., make decisions about wellbore locations, well trajectories, probabilities of subsurface reservoir locations, or any other technical field for which seismic data is applicable. For example, the method 500 may include generating a model representing surface wave propagation based at least in part on the extracted dispersion curves, as at 518. This model may then be used to attenuate the surface wave noise, as at 520, or for building velocity models, imaging, etc.

Figure 6:
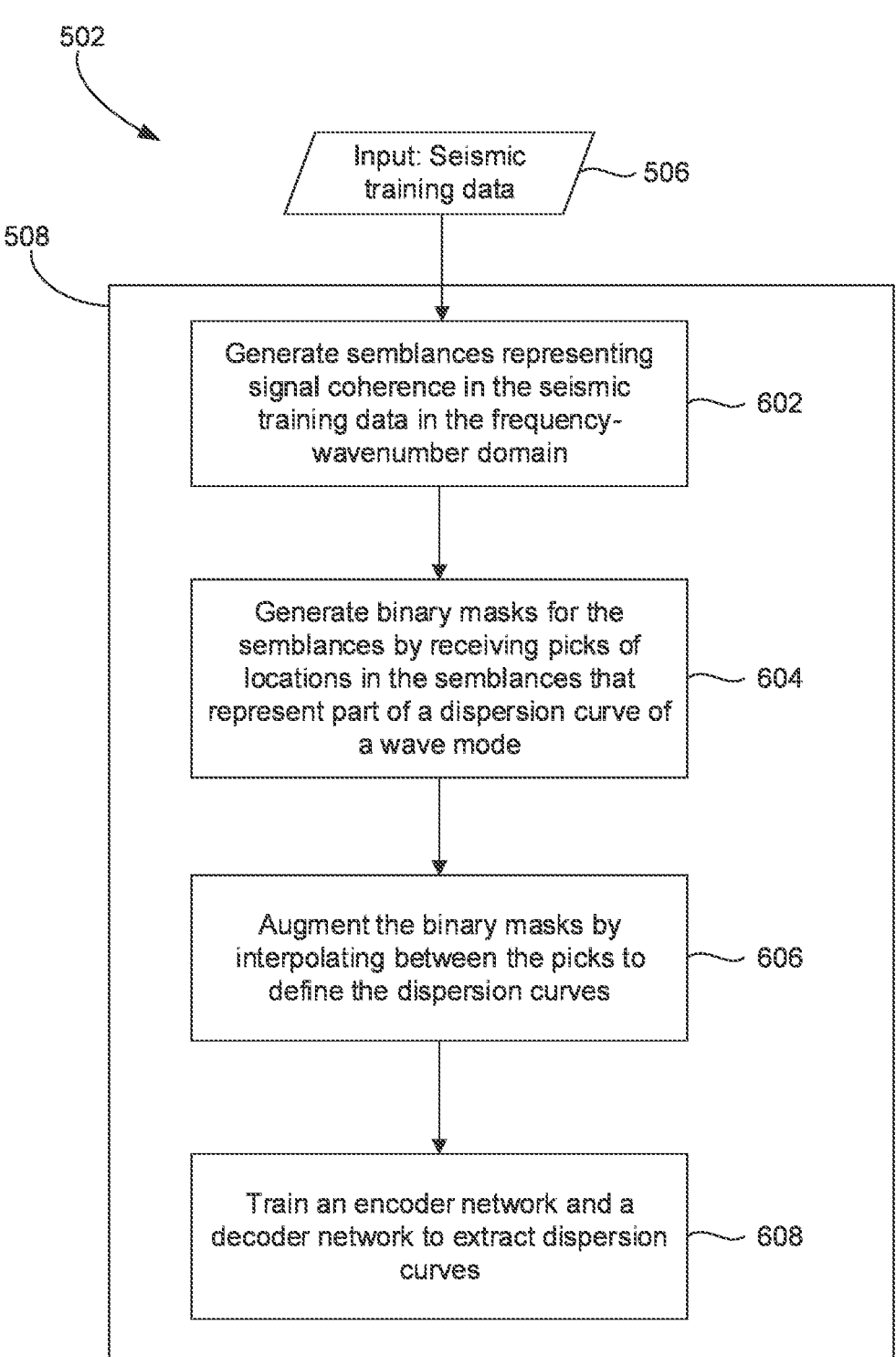
FIG. 6 illustrates a flowchart of a training stage of the method of FIG. 5 in greater detail, according to an embodiment.

FIG. 6 illustrates a flowchart of the training stage 502 of the method 500, according to an embodiment. As mentioned above, the training stage 502 may include receiving seismic training data as input at 506. The seismic input may include or be selected to provide a collection of dispersion volumes from diverse geographic regions that cover at least some near-surface conditions. This seismic training data may form the basis for the subsequent building/training of the networks that may make up the machine learning model, providing the machine learning model with sufficient "knowledge" to reliably extract dispersion curves as well as, if not better than, and potentially more efficiently than, human experts.

For example, as also discussed above, training at 508 may include generating semblances representing signal coherence in the seismic training data in the frequency-wavenumber domain, as at 602. An example of such a semblance is provided in FIG. 7A.

Figures 7A, 7B, 7C:
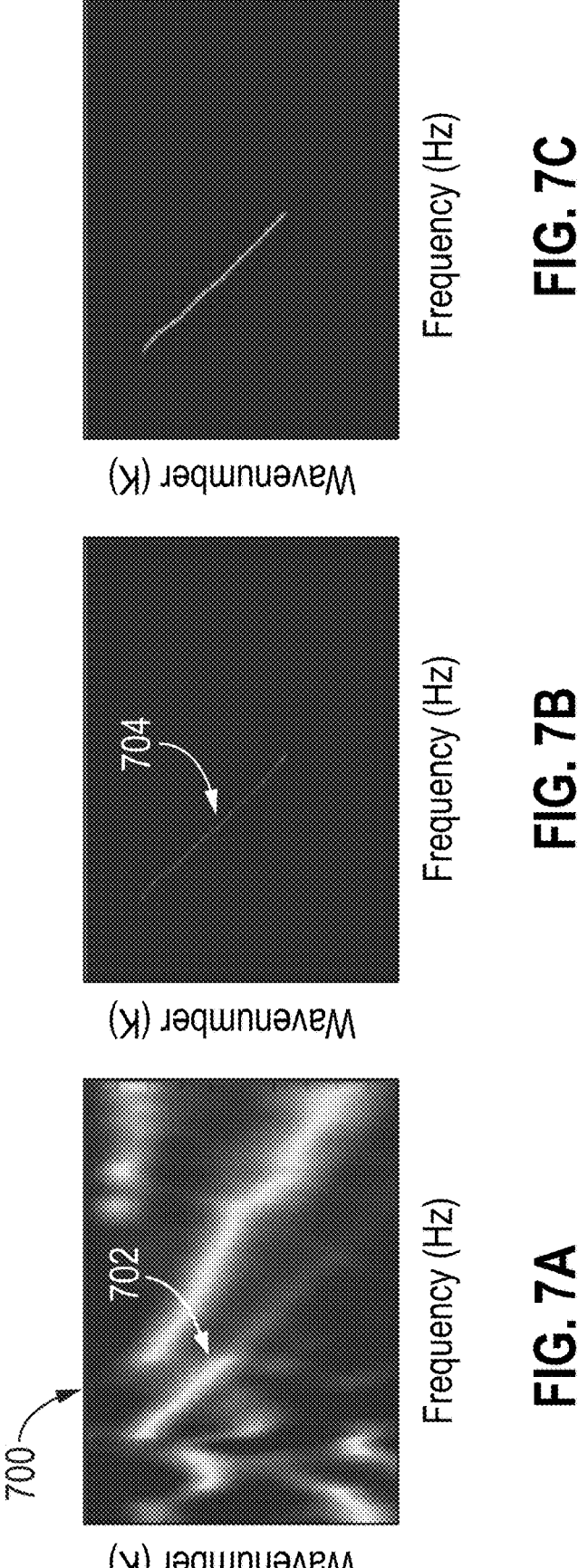
FIG. 7A illustrates an example F-K semblance input into the global fundamental picker, according to an embodiment.
FIG. 7B illustrates initial sparse manual labels for the semblance input into the global fundamental picker.
FIG. 7C illustrates an interpolated manual label.

Next, training at 508 may include generating binary masks for the semblances by receiving picks of locations in the semblance that represent part of a dispersion curve of a wave mode, as at 604. FIG. 7B illustrates an example of such a binary mask. Generating the binary masks may be based at least partially on manual input, e.g., the "picks." Specifically, a user may be presented with the semblance and may select (e.g., pick, using a mouse cursor or another input device) locations/pixels associated with a dispersion curve. In the example of FIGS. 7A and 7B, the semblance 700 includes a dispersion curve 702, which is identified by relatively sparse picks (represented as individual points) 704 in FIG. 7B.

The user-selected points 704 on the dispersion curve 702 may be relatively sparse (e.g., the user may not be called upon to select every pixel associated with the dispersion curve in the visualization of the semblance). Further, the manual picks 704 may have gaps of varying lengths therebetween that might introduce inconsistency in the learning process, if not rectified. Accordingly, the binary mask may be augmented through interpolation of the labels, as at 606. The interpolation may connect together the picks, and also identify the beginning and end of a given dispersion curve, e.g., near to the most extreme selected locations of the given curve, e.g., based on the semblance data associated with these locations. FIG. 7C illustrates the binary mask after the picks after such interpolation at 606.

Accordingly, the binary mask and the semblance combination may provide a plurality of training couples, e.g., the picks (and/or interpolations thereof). The picks/interpolation points may be identified as Fy with a corresponding semblance location Sx. Any number of training couples may be provided, e.g., tens, hundreds, or thousands thereof, as the training corpus for the machine learning model. Furthermore, some of the training pairs may be based on the same underlying data. For example, to supplement what may be a relatively small number of training pairs, the semblance may be shifted vertically or horizontally by a distance in the frequency-wavenumber domain, with the mask likewise shifted.

Next, the training at 508 may proceed to the actual building of the layers of the machine-learning model. For example, training at 508 may include training an encoder network and a decoder network to extract the dispersion curves from semblance data, as at 608. The machine learning model may perceive the semblance input Sx as a set of visual features and applies the learned rules that capture the spatial visual dependencies on a given semblance to the predict one or more modes. In this way, the modes may be annotated for each pixel of the semblance panel throughout the dispersion volume, making the picking process a binary segmentation task.

Machine Learning for Dispersion Curve Picking

Figure 8:
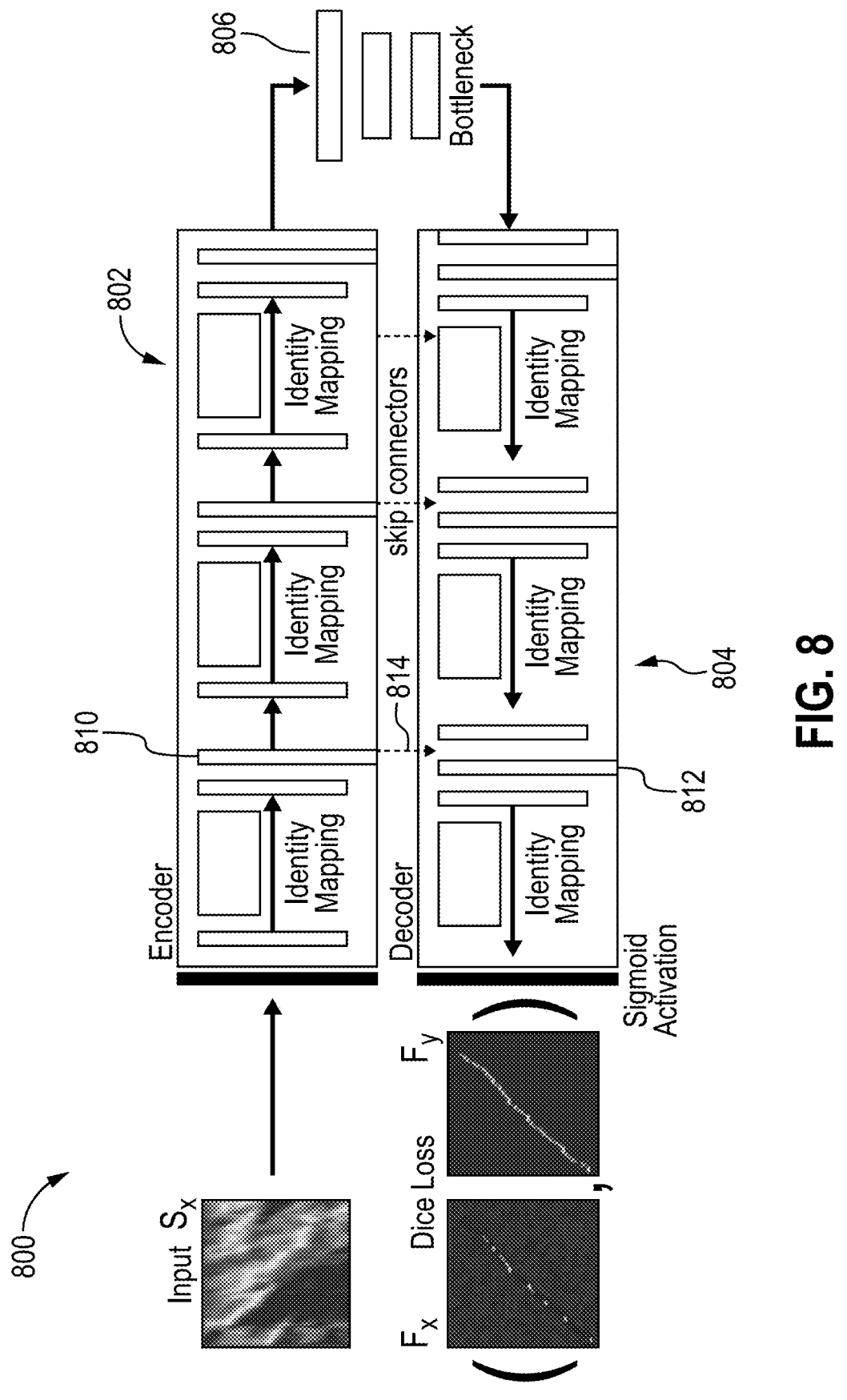
FIG. 8 illustrates a block diagram of a Unet backbone with residual blocks, e.g., an architecture used to train the global fundamental picker, according to an embodiment.

In an embodiment, the machine learning model may be a global fundamental picker that is a program based on tensors and is structured as a U-Net encoder-decoder residual convolutional neural network, for example, as schematically depicted in FIG. 8. Accordingly, as shown in FIG. 8, the machine learning model 800 may include an encoder network 802 and a decoder network 804, with a bottleneck 806 therebetween. The encoder network 802 includes initialized tensors that encode the spatial features of the input semblance as strided convolution down-samples thereof. The decoder network 804 takes some (e.g., relatively impactful) reduced low-level features when delineating a mode (e.g., the fundamental) on a semblance and constructs a segmentation mask at the same scale as the input using a series of transposed convolutions, padding pixels between the reduced features.

The encoder-decoder architecture is symmetrical, and thus features extracted in one encoding layer (e.g., layer 810) can be concatenated to its corresponding decoding layer (e.g., layer 812) using long skip connections 814. These connections 814 may help propagate small/midscale features or signals through the machine learning model 800. Thus, a largescale feature learned in the model 800 can help form a multiscale feature set at a later part of the network. In addition to long skip connections, blocks in the encoder and decoder networks 802, 804 may include short skip connections that include gating identity mapping connection and full pre-activation residual units to although marginally increase the training error but significantly reducing the test error.

Overall, the architecture of the machine learning model 800 may be considered a U-Net backbone with residual blocks, built to handle multiscale features. This architecture may be selected based on a comprehensive empirical comparative study of performance with and without the residual blocks.

During the training process, the weights of the connections between neurons in the architecture may be adjusted as the method 500 parses sample semblances and attempts to reduce a loss between the predicted fundamental ($F_x$) (or any other mode) and the target fundamental ($F_y$) (or, correspondingly, any other mode). The loss function may be a Dice Loss, as shown, that measures the overlap between the predicted and the label matrices. The values associated with the network connections are adjusted based on the scale of the loss.

Being fully convolutional, this architecture may be invariant to translation and morphology, so it can learn to pick the modes that may vary in size, resolution, degree of slope, and may be continuous or fragmented. The model 800 may, for example, be trained with a batch size of 8 samples, and 10 percent of the training data may be set aside as validation samples. After each epoch, the gradients are updated according to the Nesterov Adam optimizer, for example, and performance on the validation samples may be monitored.

Figure 9A:
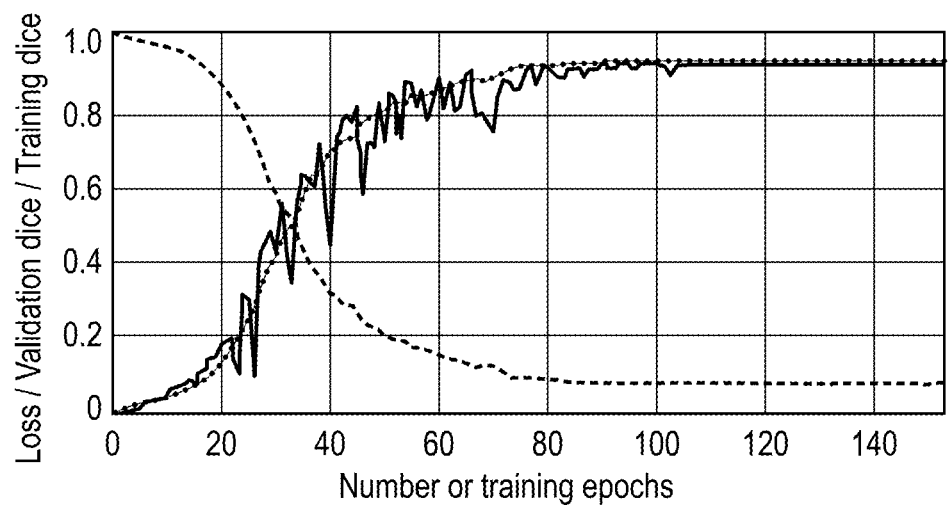
FIG. 9A illustrates an example of performance of a machine-learning system implementing an embodiment of the machine-learning techniques disclosed herein.
Figure 9B:
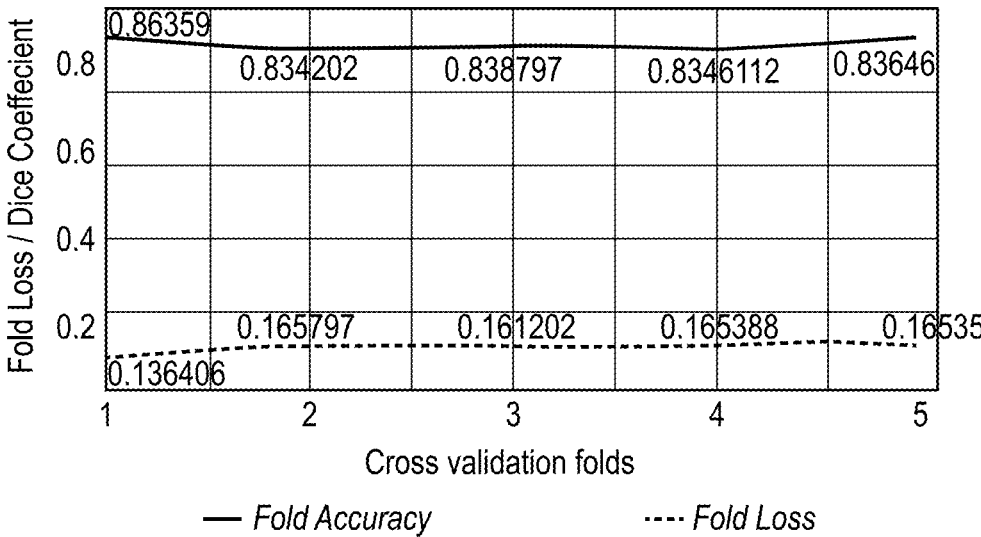
FIG. 9B illustrates an example of performance during cross validation.

The learning rate may be made to decay by a factor, e.g., of 0.25 when the loss on validation samples stagnates but has a minimum slab at $2.5 \times 10^{-4}$. On monitoring the statistics of the training (FIG. 9A), the network converges at about 120 epochs as can be seen by the stabilizing validation accuracy and training loss. In order to study the consistency and stability of the architecture with tuned hyperparameters, five-fold cross-validation may be done on data by splitting it in five equal parts with five iterations of holding out one part for validation and training of the remaining four. As FIG. 9B shows, the study concluded that the architecture is quite stable with an average accuracy of 0.841 and average loss of 0.1588.

Once cross validation determines the architecture in its tuned form to be stable, it is retrained on the entire training dataset. During inference, semblances from any survey unseen during the training process can be made to pass through this calibrated neural network architecture and its associated trained weights to obtain a prediction of the fundamental. Occasionally the machine may pick very small segments from the higher modes given their high amplitude and close proximity to the fundamental, and these segments can be removed using DBSCAN, as a method of clustering the points in the predicted fundamental mask that jointly form the fundamental mode separate from all other noisy segments. The cluster that contains the noisy segments can be isolated and removed from the predictions.

Example Results

Figures 10A, 10B, 10C:
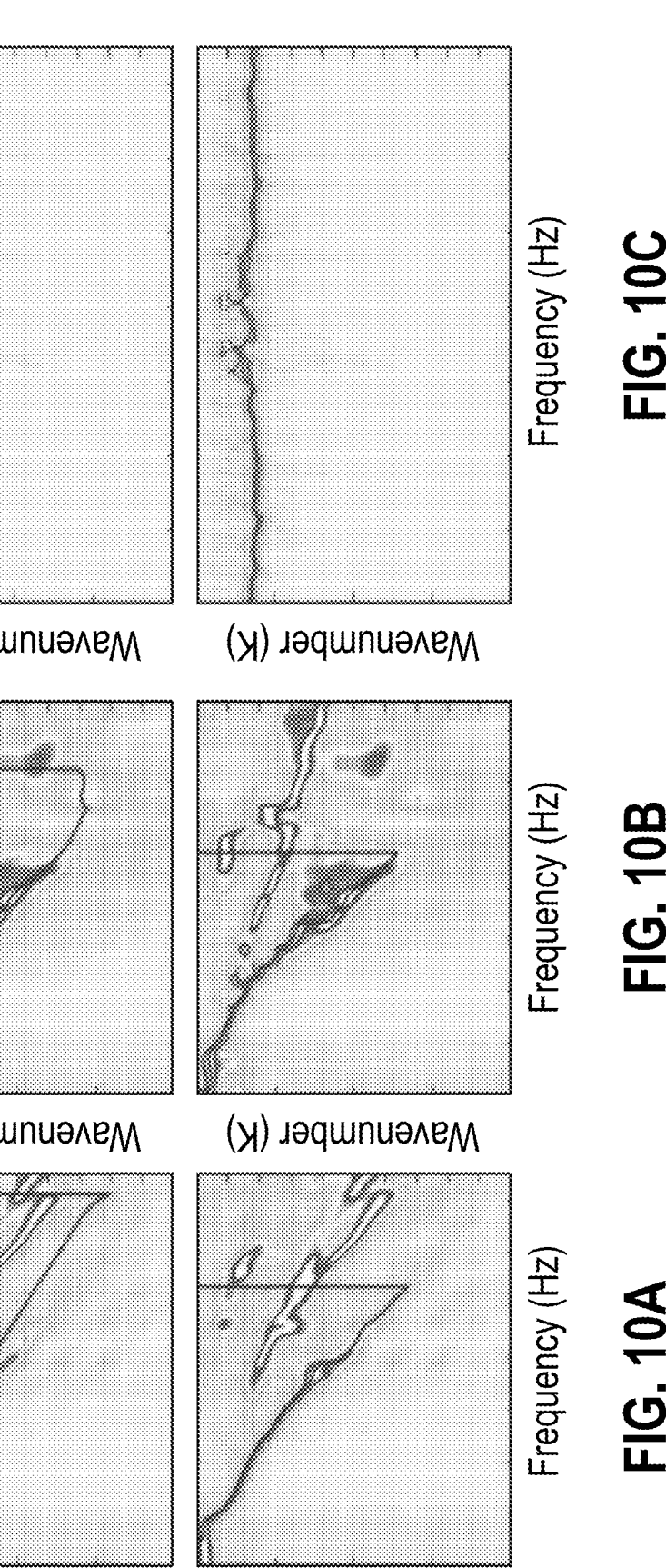
FIGS. 10A, 10B, and 10C illustrate a comparison between the conventional picking (top) versus the final ML picks (bottom) at two different analysis locations (FIG. 10A and FIG. 10B, respectively) and an 8 Hz iso-frequency plot along a receiver line (FIG. 10C).

The effectiveness of an embodiment of the present method, including the global fundamental picker, was validated on a 3D land survey, located in the Cooper Basin in South Australia. No training data from this region was used as part of training and the generalization capability of the machine learning architecture may improve as more diverse sets of surveys are appended to the training data. The validation involved the application of the global picker to 13,000 analysis locations followed by comparison against the already available human intensive non-ML picks. The ML tool provided approximately 3% more picks than the non-ML picks over a frequency range of 4 to 10 Hz and achieved this in just 1.5 hours versus 14-21 hours (including testing) for the established approach. The machine learning predictions consistently picked the higher frequency tails of the fundamental (FIG. 10A), comprehended breaks in the fundamental mode (FIG. 10B) and improved spatial consistency (FIG. 10C) adding quality improvements to the observed efficiency gains.

Accordingly, it will be appreciated that embodiments of the present disclosure may provide a robust and automated machine learning driven approach for dispersion curve picking that provides the opportunity to increase efficiency and reduce the turn-around time of the surface wave analysis phase, e.g., by reducing human interaction.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Computer Hardware

Figure 11:
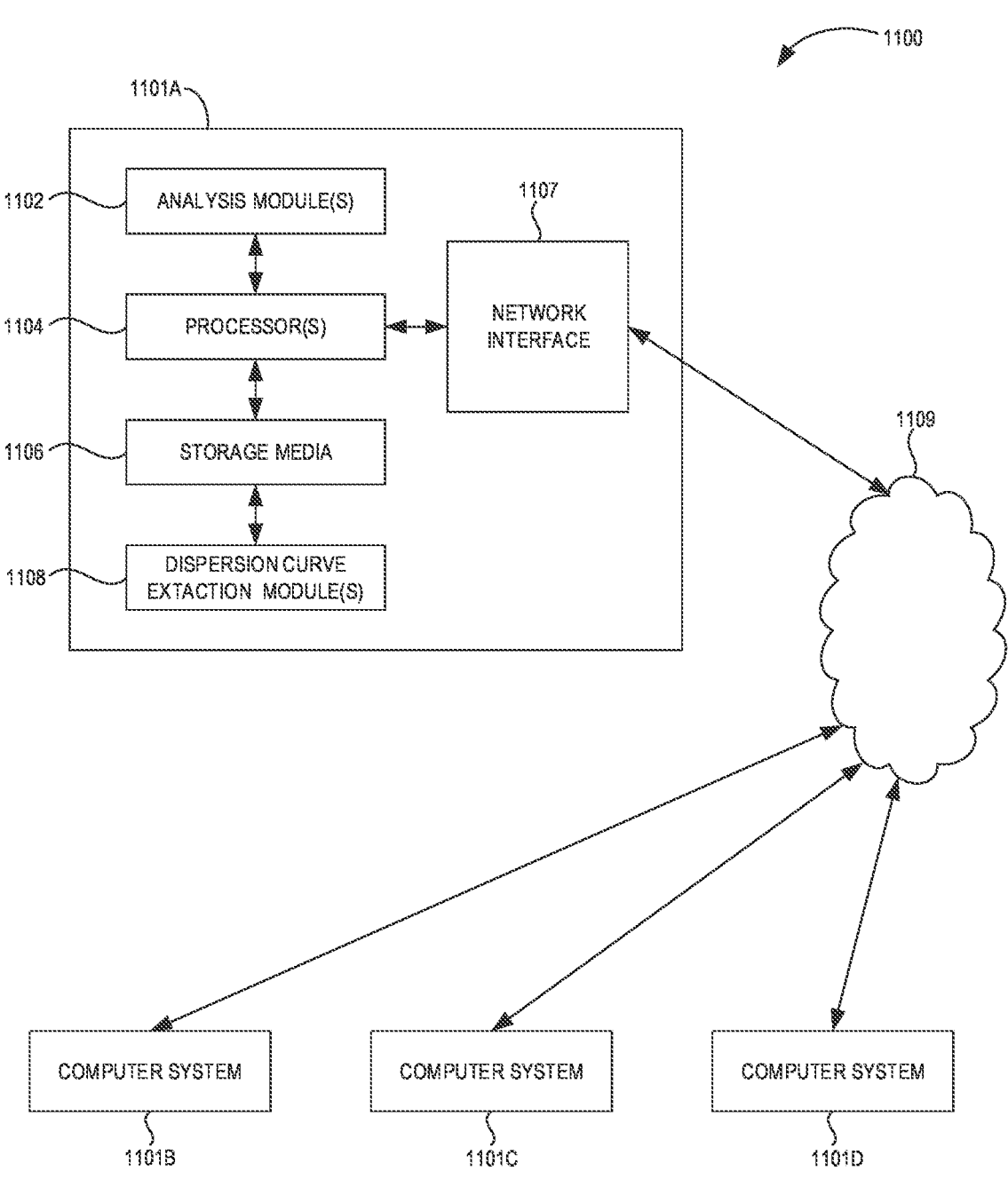
FIG. 11 illustrates a schematic view of a computing system, according to an embodiment.

In some embodiments, any of the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis module(s) 1102 configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1100 contains one or more dispersion curve extraction module(s) 1108. In the example of computing system 1100, computer system 1101A includes the dispersion curve extraction module 1108. In some embodiments, a single dispersion curve extraction module may be used to perform some or all aspects of one or more embodiments of the methods. In alternate embodiments, a plurality of dispersion curve extraction modules may be used to perform some or all aspects of methods.

It should be appreciated that computing system 1100 is only one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for modeling a subterranean volume, comprising:

receiving seismic data comprising a signal;

generating a semblance in a frequency-wavenumber domain for the seismic data, wherein the semblance represents a coherence of the signal in the frequency-wavenumber domain;

extracting one or more wave energy modes in the semblance using a machine learning model trained to identify dispersion curves in the semblance based on a visible characteristic of the dispersion curves, wherein extracting the one or more wave energy modes in the semblance using the machine learning model comprises:

using an encoder network of the machine learning model, the encoder network having initialized tensors that encode spatial features of an input semblance as strided convolution down-samples; and using a decoder network to construct a segmentation mask as a filter at a same scale as the input semblance to be applied to the semblance in conjunction with identifying the dispersion curves in the semblance; and generating a model representing surface wave propagation based at least in part on the identified one or more wave energy modes.

2. The method of claim 1, further comprising training the machine learning model using a training corpus of dispersion volumes and associated training semblances collected from a plurality of geographic regions including one or more near-surface conditions.

3. The method of claim 2, further comprising increasing a size of the training corpus by shifting one or more of the training semblances by a vertical distance, a horizontal distance, or both.

4. The method of claim 2, wherein training the machine learning model further comprises:

generating a binary mask for each of the training semblances, wherein the binary masks each include labels corresponding to one or more pixels of a training semblance associated with the respective binary mask, the one or more pixels each representing part of one or more wave energy modes; and training the machine learning model based on pairs of the binary masks and semblances.

5. The method of claim 4, further comprising interpolating between the labels to extract a dispersion curve from spaced-apart labels.

6. The method of claim 1, further comprising training the machine learning model, wherein training the machine learning model comprises concatenating one or more of the spatial features of a layer of the encoder network to a corresponding layer of the decoder network using skip connections that skip one or more layers of the encoder network, the decoder network, or both.

7. The method of claim 1, wherein the one or more modes that are extracted include a plurality of modes, and wherein the method further comprises ordering the plurality of modes based on propagation speed.

8. The method of claim 1, further comprising attenuating surface wave noise based at least in part on the model.

9. A non-transitory computer-readable medium storing instructions that, when executed by at least one processor of a computing system, cause the computing system to perform operations, the operations comprising:

receiving seismic data comprising a signal;

generating a semblance in a frequency-wavenumber domain for the seismic data, wherein the semblance represents a coherence of the signal in the frequency-wavenumber domain;

extracting one or more wave energy modes in the semblance using a machine learning model trained to identify dispersion curves in the semblance based on a visible characteristic of the dispersion curves, wherein extracting the one or more wave energy modes in the semblance using the machine learning model comprises:

using an encoder network of the machine learning model, the encoder network having initialized tensors that encode spatial features of an input semblance as strided convolution down-samples; and using a decoder network to construct a segmentation mask as a filter at a same scale as the input semblance to be applied to the semblance in conjunction with identifying the dispersion curves in the semblance; and generating a model representing surface wave propagation based at least in part on the identified one or more wave energy modes.

10. The medium of claim 9, further comprising training the machine learning model using a training corpus of dispersion volumes and associated training semblances collected from a plurality of geographic regions including one or more near-surface conditions.

11. The medium of claim 10, wherein the operations further comprise increasing a size of the training corpus by shifting one or more of the training semblances by a vertical distance, a horizontal distance, or both.

12. The medium of claim 10, wherein training the machine learning model further comprises:

generating a binary mask for each of the training semblances, wherein the binary masks each include labels corresponding to one or more pixels of a training semblance associated with the respective binary mask, the one or more pixels each representing part of one or more wave energy modes; and training the machine learning model based on pairs of the binary masks and semblances.

13. The medium of claim 12, wherein the operations further comprise interpolating between the labels to extract a dispersion curve from spaced-apart labels.

14. The medium of claim 9, wherein the operations further comprise training the machine learning model, and wherein training the machine learning model comprises concatenating one or more of the spatial features of a layer of the encoder network to a corresponding layer of the decoder network using skip connections that skip one or more layers of the encoder network, the decoder network, or both.

15. The medium of claim 9, wherein the one or more modes that are extracted include a plurality of modes, and wherein the operations further comprise ordering the plurality of modes based on propagation speed.

16. The medium of claim 9, wherein the operations further comprise attenuating surface wave noise based at least in part on the model.

17. A computing system, comprising:

one or more processors; and a memory system comprising one or more non-transitory computer-readable media storing instructions that, when executed by at least one of the one or more processors, cause the computing system to perform operations, the operations comprising:

receiving seismic data comprising a signal;

generating a semblance in a frequency-wavenumber domain for the seismic data, wherein the semblance represents a coherence of the signal in a frequency-wavenumber domain;

extracting one or more wave energy modes in the semblance using a machine learning model trained to identify dispersion curves in the semblance based on a visible characteristic of the dispersion curves, wherein extracting the one or more wave energy modes in the semblance using the machine learning model comprises:

using an encoder network of the machine learning model, the encoder network having initialized tensors that encode spatial features of an input semblance as strided convolution down-samples; and using a decoder network to construct a segmentation mask as a filter at a same scale as the input semblance to be applied to the semblance in conjunction with identifying the dispersion curves in the semblance; and generating a model representing surface wave propagation based at least in part on the identified one or more wave energy modes.

18. The system of claim 17, wherein the operations further comprise:

training the machine learning model using a training corpus of dispersion volumes and associated training semblances collected from a plurality of geographic regions including one or more near-surface conditions, wherein training the machine learning model comprises:

generating a binary mask for each of the training semblances, wherein the binary masks each include labels corresponding to one or more pixels of a training semblance associated with the respective binary mask, the one or more pixels each representing part of one or more wave energy modes; and training the machine learning model based on pairs of the binary masks and semblances; and interpolating between the labels to extract a dispersion curve from spaced-apart labels.

19. The method of claim 1, further comprising:

consolidating the identified one or more wave energy modes into a single mode track;

ordering the identified one or more wave energy modes whereby the identified one or more wave energy modes in the single mode track are consistently numbered at associated analysis locations with a fundamental mode of the identified one or more wave energy modes being assigned a predetermined numerical identifier; and performing a noise modelling step utilizing the ordering of the identified one or more wave energy modes as being directly mapped to an order of surface wave noise removal.

\* \* \* \* \*